June 26, 1934.  H. A. RHODES ET AL  1,964,141
IMPEDANCE MEASURING CIRCUITS
Filed Sept. 20, 1932

INVENTORS
H. A. Rhodes and F. A. Cowan
BY
ATTORNEY

Patented June 26, 1934

1,964,141

UNITED STATES PATENT OFFICE 1,964,141

IMPEDANCE MEASURING CIRCUITS

Harold A. Rhodes, Montclair, and Frank A. Cowan, East Orange, N. J., assignors to American Telephone and Telegraph Company, a corporation of New York Application September 20, 1932, Serial No. 634,082

8 Claims. (Cl. 175—183)

Figure 1:
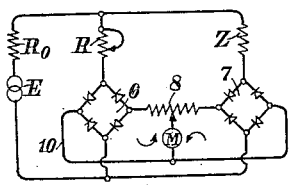
Figure 2:
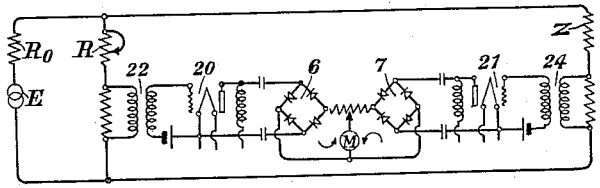
Figure 3:
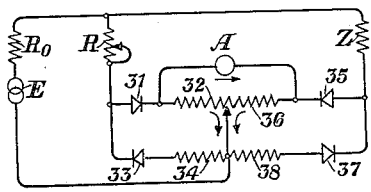
Figure 4:
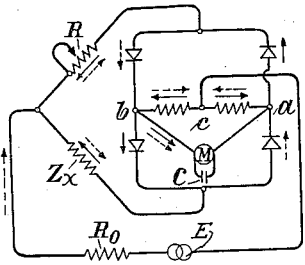
Figure 5:
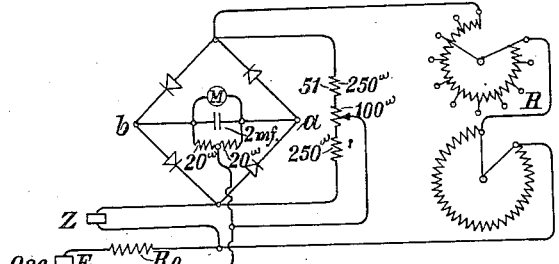
Figure 6:
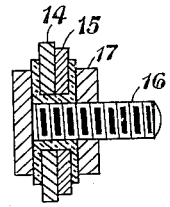
Figure 7:
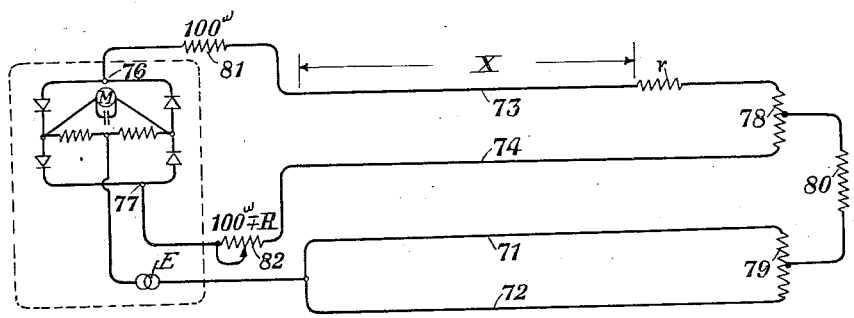

This invention relates to impedance measuring circuits, and more particularly to a rectifier bridge network. Its purpose is to compare the magnitude of two impedances by means of rectifiers and direct current indicating instruments, all in a manner giving results which are independent of frequency. The invention will be better understood by reference to the following specification and accompanying drawing in which Figures 1 and 2 show circuits which are adapted for carrying out the purpose of this invention. Figs. 3, 4 and 5 show modifications of simplified circuits. Fig. 6 is a detail regarding rectifiers used in this invention, and Fig. 7 illustrates one application of our measuring circuit.

Referring more specifically to Fig. 1, there are shown two impedances R and Z which are to be compared so far as magnitude is concerned. One of these, such as R, is preferably a pure ohmic resistance and is made variable in size in order that it may be brought to the same magnitude as the impedance of the element Z. A source of alternating voltage E is connected to supply alternating current to the elements R and Z in parallel. In series with the element R is a rectifier network 6 which, in this case, comprises a square or rectangle of four rectifiers commonly known as a "full-wave" rectifier. A similar network of rectifiers 7 is connected in series with the element Z. The elements R and Z are connected respectively to one corner of their rectifier networks, the opposite or diagonal corners of the square being brought together and connected to the one terminal of the generator E as shown in the drawing. The third corners of each square are connected together through a comparatively small resistance 8, and the fourth corners are bridged by a conductor 10 with an indicating meter M bridged from the conductor 10 to some point of the resistance 8, preferably near the middle thereof, and, in any event, adjustable as to its position. It will be observed that the rectifier networks 6 and 7 are so connected that full wave current flows through both impedance elements. It will also be observed that the rectifiers are so connected that current through the impedance element R will flow through the conductor 10 and the meter M in one direction only, as indicated by the arrow. Similarly, current through the impedance Z will flow through the network 7 and the meter M in one direction only, this being in the opposite direction to that of the current through the element R. Thus, the meter M acts as a differential indicating device, the deflection being proportional to the difference between the two currents. If the resistances of the networks 6 and 7 are small compared to the impedances of the two elements, and if the connection of the meter is to the midpoint of resistance 8, then the respective components of currents will be inversely proportional to the impedances of the elements R and Z. By adjustment of the resistance R, it is possible to bring the current through the meter M to zero value, thus indicating that the magnitude of R has been brought to the same value as that of Z.

The rectifiers in the circuit may be of any suitable form, and whatever their resistances they will have their effect on the current that flows through each branch. If, however, rectifiers of the proper type are chosen, these resistances may be so small as to be negligible compared with such magnitudes as are commonly present in many measurements. A form of rectifiers which we find especially suitable for this circuit, are those commonly known in the art as rectox elements which have resistances of very low values for currents in the one direction. From the circuit arrangement it is seen that these rectifiers should preferably be well matched so far as their characteristics are concerned. That is, they should, among other things, offer the same resistance under a given impressed voltage. This is a condition which it is commonly difficult to meet fully, but in this particular type of rectifier we find that a considerable change in the resistance of a rectifier unit may be brought about by change in pressure between the elements constituting the rectifier. This is illustrated in Fig. 6 in which the discs 14 and 15 constitute the rectifier, the elements being held together by a bolt 16 and a nut 17 through which pressure may be applied to the discs. By suitable adjustment of this pressure then, the rectifiers may be brought to very nearly the same value. Still finer adjustment may be made by shifting the contact of the meter terminal on the resistance 8, the adjustment being such that when the elements R and Z are replaced by two equal known ohmic resistances the current through the meter shall be equal to zero.

A modification of the circuit of Fig. 1 is shown in Fig. 2, wherein vacuum tube amplifiers 20 and 21 with suitable output circuits are connected to the networks 6 and 7, and suitable transformers 22 and 24 associate the input circuits of these amplifiers to the branches containing the elements R and Z. In all other respects the circuit is identical to that of Fig. 1.

Another modification of our measuring circuit is shown in Fig. 3, in which the eight rectifiers of the previous figures are reduced to four rectifiers. Here also, the generator E supplies full wave current to the elements R and Z in parallel. In series with the resistance R we connect two parallel branches consisting of the rectifier 31 and resistance 32 in parallel with a similar rectifier 33 and resistance 34, the rectifiers being oppositely directed so that full wave current may flow through the element R. Similarly, in series with the impedance Z is a rectifier 35 in series with a resistance 36, these being in parallel to a rectifier 37 and resistance 38. The midpoint of the resistances 32 and 36 taken together, and the midpoint of the resistances 34 and 38 taken together, are connected to the opposite terminal of the generator E. An indicator element A, such as a direct current meter, is bridged across the resistances 32 and 36. As an illustration of the operation of this circuit we may assume that the magnitude of R is less than the magnitude of Z, that the rectifier units have the same resistance and, for simplicity, that the resistances 32, 34, 36 and 38 have the same value. In this case, the current flowing through the resistance 32 will be greater than that through 36, from which it will be apparent that current will flow through the indicating instrument A in the direction indicated by the arrow. Upon increasing the resistance R the current through A will gradually decrease until it reaches a zero value indicating an equality in magnitude of the elements R and Z. It will be observed that in this circuit, although full wave current flows through the impedances, current flows through the ammeter A during half the cycle only, but the sensitivity is still sufficiently high for many purposes. Slight differences in the characteristics of the rectifiers may be compensated for by adjustment of the contact to the resistances 32 and 36, as shown in the figure.

A still further modification of our circuit is shown in Fig. 4, this being a preferred form for the reason that the number of rectifiers is kept to four and current flows through the meter M for both halves of the wave. The operation of this circuit is made clear by the arrows, it being assumed that current flows through the rectifiers in the direction of the arrow point. In this, as well as in the other figures, we find it desirable to bridge a condenser C across the meter as a shunt for A. C. components.

Fig. 5 shows a further embodiment of the circuit of Fig. 4, the actual values of resistances used in certain of our rectifier bridges being shown for purposes of illustration. It will be observed that across the diagonal a—b there are connected resistance elements as described above, these having values of about 20 ohms. To the other diagonal corners are connected the impedances R and Z in a manner similar to that shown in Fig. 4. Also across this diagonal there is connected a resistance 51 which, in this case, is shown as totaling 600 ohms, there being an adjustable connection from approximately the middle thereof to the midpoint of the resistances across the diagonal a—b. By adjustment of the contact to this resistance 51, compensation for slight differences in the rectifier units may be made in such a manner that when R and Z are equal pure ohmic resistances, the deflection in the meter M shall be brought to zero. In series with the generator E of this figure, as well as in all of the other figures, there is introduced a resistance $R_0$ in order to adjust the current flowing through the circuit to a desired value.

While reference has been made to the fact that the magnitude of the impedance is measured by this circuit, it may at times be desirable to find the relative values of resistance and reactance in the impedance, that is, to find the angle of the impedance. This may be done by taking first an observation on the magnitude of the impedance in the manner indicated above, and then taking a second observation after adding in series with the impedance a known resistance. By simple calculations then, which are well understood in the art, one can separate the ohmic impedance from the reactive impedance.

While this measuring circuit may be used in many different ways, Fig. 7 illustrates one application which we find particularly useful. The portion included within the dotted rectangle represents the measuring circuit as described above, and this figure shows its adaption for the determination of unbalance in a phantom telephone circuit. Thus, the conductors 71 and 72 indicate the line of one telephone side circuit, and the conductors 73 and 74 are the line of the other side circuit, and these wires taken in pairs, constitute the phantom circuit in a manner well known in the art. In such a circuit it is important at times to know whether the characteristic impedance of the conductor 73 with respect to the conductors 71 and 72 taken in parallel, differs from that of the conductor 74 with respect to the conductors 71 and 72. Any difference between these is spoken of as the unbalance in the phantom circuit. For measuring this unbalance, connection may be made as shown in Fig. 7 in which the conductor 73 is connected to the rectifier bridge at the point 76, and the conductor 74 is connected at the point 77. For suitable comparison the usual terminal apparatus may be replaced by terminating resistances 78, 79 and 80 in a manner well understood in the art. If, now, there should be present in the one line such as 73, a certain unbalance r at a distance X from the measuring end, then the current flowing through the respective conductors 73 and 74 will not be equal and there will, therefore, be an indication on the meter M. The amount of unbalance may be determined by the introduction of resistance in the conductor 74, preferably at 82. Since, in general, it will not be known which conductor will show the higher impedance, we find it convenient to insert a fixed resistance 81, here shown, as a magnitude of 100 ohms, and the variable resistance 82. By methods which are known in the art, but which do not constitute a part of this invention, it is possible to determine with this measuring circuit how far out on the line the unbalance r is situated, as well as its magnitude.

It is apparent that many other special applications for this measuring circuit might be devised, and also that sundry variations may be made in the circuit itself, all without departing from the spirit of our invention as set forth in the following claims.

What is claimed is:

1. In a circuit for comparing two impedances a square form circuit with a rectifier in each side all pointing in the same direction around the square, a resistance connected across one diagonal, the two impedances connected in series across the other diagonal, a source of alternating current voltage with one terminal connected to the midpoint of the said resistance and the other terminal connected to the point between the two impedances, and a direct current indicator in parallel to the said resistance.

2. The combination of claim 1 characterized by the fact that the one impedance is a variable known resistance.

3. The combination of claim 1 characterized by the fact that there is a relatively high resistance across the second named diagonal with a connection from the midpoint of the first named resistance to an adjustable point near the middle of the high resistance, and further characterized by the fact that the impedance is a variable known resistance.

4. The combination of claim 1 characterized by the fact that the rectifiers are of the rectox or copper-copper oxide form and that the pressure on the elements is adjustable for resistance matching.

5. In a circuit for comparing two impedances, a set of four rectifiers arranged in a square form circuit, an A. C. source and a D. C. meter, the A. C. source being connected to supply power to the impedances in parallel, each impedance being associated with two of said four rectifiers so directed that one passes the one phase and the other the opposite phase of the A. C. source through its impedance, and said D. C. meter connected to be responsive to the difference in current through the impedances.

6. In an impedance measuring circuit, an alternating current source of E. M. F., two impedances supplied in parallel from said source, a set of four rectifiers in a square form circuit, and a direct current indicating device, said two terminal impedances being connected to opposite terminals of said square circuit so that two of the rectifiers being used to pass one the one phase and the other the opposite phase of the A. C. source through one impedance and the other two rectifiers similarly for the other impedance, the elements of the circuit being so associated that the current through the indicating device is proportional to the difference in current through the impedances.

7. In an impedance measuring circuit, an alternating current source of E. M. F., two impedances to be compared connected in parallel to one terminal of the source, the other ends of the impedances being connected together by two parallel branches, one branch having two rectifiers in series and pointing in opposite directions and a resistance between them, the second branch being the same as the first except that the corresponding rectifiers are oppositely directed, the second terminal of the source being connected to the midpoints of the two resistances and a direct current meter bridged across one of said resistances.

8. The combination of claim 7 characterized by the fact that the connection from the second terminal of the source to the resistance across which the meter is bridged is adjustable to compensate for differences in the rectifiers.

HAROLD A. RHODES.
FRANK A. COWAN.